United States Patent [19]
Tanno et al.

[11] Patent Number: 5,161,049
[45] Date of Patent: Nov. 3, 1992

[54] OPTICAL ISOLATOR AND METHOD FOR PREPARING SAME

[75] Inventors: Masayuki Tanno; Toshiaki Watanabe, both of Annaka; Toshihiko Ryuo, Gunma, both of Japan

[73] Assignee: Shin-Etsu Chemical Co., Ltd., Tokyo, Japan

[21] Appl. No.: 686,422

[22] Filed: Apr. 16, 1991

[30] Foreign Application Priority Data

Apr. 18, 1990 [JP] Japan .................. 2-100404

[51] Int. Cl.$^5$ .......................... G02B 1/09; C03C 8/24
[52] U.S. Cl. .................. 359/281; 359/484; 501/15; 501/22
[58] Field of Search ........... 359/280, 281, 282, 283, 359/900, 484; 372/33, 700; 501/15, 22

[56] References Cited

U.S. PATENT DOCUMENTS

| | | | |
|---|---|---|---|
| 4,068,923 | 1/1978 | Toida | 359/900 |
| 4,449,096 | 5/1984 | Doriath et al. | 359/281 |
| 4,686,678 | 8/1987 | Ohta et al. | 372/33 |
| 4,770,505 | 9/1988 | Okazaki | 359/283 |
| 4,804,256 | 2/1989 | Wilson | 359/281 |
| 4,983,481 | 1/1991 | Yu | 430/59 |
| 5,016,129 | 5/1991 | Goto et al. | 360/103 |

FOREIGN PATENT DOCUMENTS 1-200223  8/1989  Japan .

Primary Examiner—Bruce Y. Arnold
Assistant Examiner—Martin Lerner
Attorney, Agent, or Firm—McAulay Fisher Nissen Goldberg & Kiel

[57] ABSTRACT

An optical isolator according to the present invention comprises a first polarizer, a Faraday rotator and a second polarizer which are adhered to one another in this order and held in a cylindrical magnet, wherein at least one adhered and supported portion comprises a low melting point glass 7 and 8. As the low melting point glass 7, 8, there may be used, for instance, those mainly comprising lead oxide and boron oxide; zinc oxide, lead oxide and boron oxide; lead oxide, boron oxide and thallium oxide; phosphoric acid and aluminum oxide; zinc oxide and boron oxide; and phosphorous pentaoxide, aluminum oxide and boron oxide. In the optical isolator according to the present invention, a low melting point glass is used for adhering the structural parts for the optical isolator, there is not observed any outgassing phenomenon due to the raise in ambient temperature as in the isolator which is assembled with an adhesive and the discrepancy of the optical axis due to the expansion of the adhesive. As a result, the isolator of the present invention has stable optical properties. Moreover, the underlying plating layer is not peeled off as has been observed in the isolators which is assembled through soldering.

16 Claims, 1 Drawing Sheet

OPTICAL ISOLATOR AND METHOD FOR PREPARING SAME

BACKGROUND OF THE INVENTION

The present invention relates to an optical isolator for preventing the reflection of the light rays emitted from a light source at an end face of an optical system and the returning back of the reflected light rays to the light source as well as a method for preparing the same.

When light rays from a light source are transmitted through an optical system, a part of the light rays is reflected on the end face of the optical system and returned back to the light source. For instance, when an optical signal is transmitted through an optical fiber, the light rays emitted from a laser light source are projected on the end face of the optical fiber, most of the light rays pass through the optical fiber as the transmitted light rays, but a part thereof is reflected on the surface of lenses and the end face of the optical fiber, thus returned back to the laser light source and again reflected on the end face of the laser source to thus serve as a source of noises.

An optical isolator is in general employed in order to eliminate such noises. The optical isolator in general comprises a first polarizer, a Faraday rotator and a second polarizer which are arranged in this order. The Faraday rotator is accommodated in a hollow cylindrical magnet. These parts are in general assembled with the aid of an adhesive.

However, an optical isolator which is assembled with the aid of an adhesive suffers from problems in that it may cause outgassing due to the rise in the environmental temperature and that the optical axis thereof is deflected due to the expansion of the adhesive and, therefore, the optical properties thereof are unstable. Moreover, it takes a long time period for hardening the adhesive during preparing the same and correspondingly the production efficiency is low.

It has been tried to solve these problems by assembling the optical isolator with the aid of a solder material. For instance, Japanese Patent Unexamined Publication (hereunder referred to as "J. P. KOKAI") No. Hei 1-200223 discloses an optical isolator which is prepared by forming a metal film capable of being soldered on the portion of each part through which the parts are assembled and then bonded and integrated into an assembly through soldering. According to this patent, gold plating is applied onto the surface portion of each part, i.e., the first polarizer, the Faraday rotator or the second polarizer other than the optical face thereof and they are bonded to one another through the plated areas by soldering.

Such connection of these parts through soldering is more stable than that obtained with the aid of an adhesive and can provide optical isolators having stable properties over a long time period, but the adhesion between the gold plating layer and each part is very low and accordingly the plating layer is often peeled off after the plating or soldering operation. In particular, a glassy layer such as an anti-reflection coating is often applied onto the surface of the parts such as the polarizer and the Faraday rotator and, in this case, the gold plating layer is easily peeled off. In addition, the production cost thereof increases since complicated processes such as plating process are required.

SUMMARY OF THE INVENTION

The object of the present invention is generally to solve the foregoing problems associated with the conventional optical isolators and more specifically to provide an optical isolator which can easily be produced and has high reliability since adhered portions thereof are not peeled off as well as a method for producing the same.

The inventors of this invention have found out that the reliability of optical isolators can be enhanced by assembling the parts of the optical isolator such as polarizers and Faraday rotators with the aid of a low melting point glass. Moreover, taking note of the fact that an optical isolator is obtained by assembling its structural parts through a plurality of adhering processes, the inventors have found out that it is effective to use a plurality of low melting point glasses having different transition temperatures for assembling these parts and that they are employed in the order of decreasing transition temperature thereof to thus prevent re-softening of the glass having a lower transition temperature which has been used in the preceding adhering process and deflection of the parts which have been adhered, and thus have completed the present invention.

According to an aspect of the present invention, there is provided an optical isolator which comprises a first polarizer, a Faraday rotator and a second polarizer which are adhered to one another in this order and held in a cylindrical magnet, wherein at least one adhered and supported portion is formed from a low melting point glass.

According to another aspect of the present invention, there is provided a method for producing an optical isolator which comprises a first polarizer, a Faraday rotator, a second polarizer and a magnet as structural parts thereof, the method comprises the steps of assembling a part of the structural parts with a low melting point glass and performing the assembling of the remaining parts with the aid of a low melting point glass whose transition temperature is lower than that of the foregoing low melting point glass or a solder having a melting point lower than that of the low melting point glasses.

DESCRIPTION OF THE PREFERRED EMBODIMENTS

Figure 1:
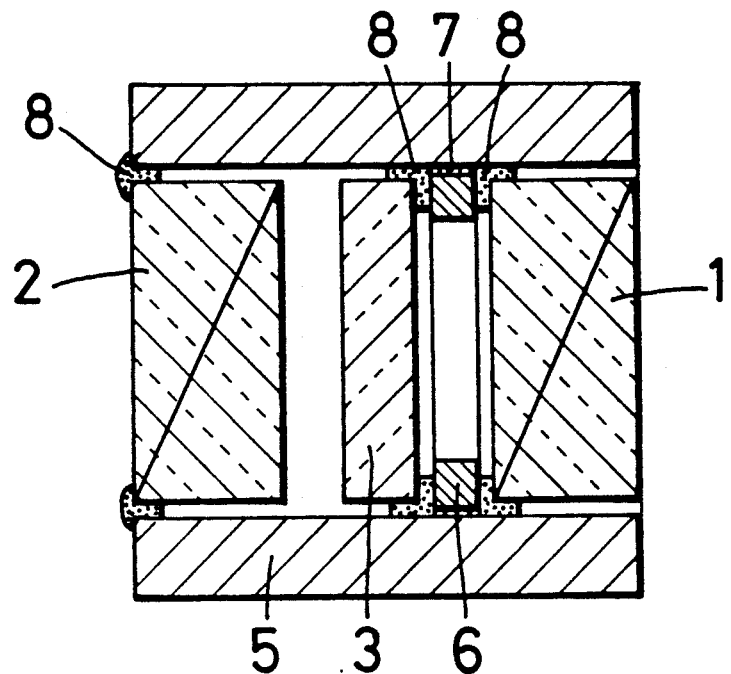
FIG. 1 is a cross sectional view of an embodiment of the optical isolator according to the present invention.

As shown in FIG. 1, the optical isolator according to the first aspect of the present invention comprises a first polarizer 1, a Faraday rotator 3 and a second polarizer 2 which are adhered to one another and held in a cylindrical magnet 5, wherein at least one adhered and supported portion is formed from a low melting point glass 7 and 8.

In addition, the second aspect of the present invention relates to a method for producing an optical isolator which comprises a first polarizer 1, a Faraday rotator 3, a second polarizer 2 and a cylindrical magnet 5 as structural parts thereof, the method comprises the steps of assembling a part of the structural parts with a low melting point glass 7 and performing the assembling of the remaining parts with the aid of a low melting point glass 8 whose transition temperature is lower than that of the foregoing low melting point glass 7 or a solder 9 having a melting point lower than that of the low melting point glasses.

As the low melting point glass 7 and 8, there may be used, for instance, those comprising, as principal components, lead oxide and boron oxide; lead oxide, boron oxide and zinc oxide; lead oxide, boron oxide and thallium oxide; phosphorous pentaoxide and aluminum oxide; boron oxide and zinc oxide; or boron oxide, phosphorous pentaoxide and aluminum oxide. In this respect, the fusing temperature of those low melting point glass 7 and 8 is desirably limited to not more than 400° C. for the purpose of preventing the deterioration of the first polarizer 1, the second polarizer 2 and anti-reflection coatings thereof.

In the concrete, the low melting glass can be used powder glass T-187 having a transition temperature of 308° C. made by Iwaki Glass K. K., powder glass XS-1175 having a transition temperature of 300° C. made by Owens Illinois Inc., powder glass LS-2001 B having a transition temperature of 310° C. made by Nippon Electric Glass K.K. or powder glass GSP220A504 having a transition temperature of 390° C. made by Toshiba Glass K.K. as the lead oxide and boron oxide (PbO.B$_2$O$_3$) type glass; powder glass IWF7575 having a transition temperature of 320° C. made by Iwaki Glass K.K. as the lead oxide, boron oxide and zinc oxide (PbO.B$_2$O$_3$.ZnO) type glass; powder glass GSP220A528 having a transition temperature of 250° C. made by Toshiba Glass K.K. as the lead oxide, boron oxide and thallium oxide (PbO.B$_2$O$_3$.Tl$_2$O) type glass; powder glass GSP220A510 having a transition temperature of 380° C. made by Toshiba Glass K.K. as phosphorous pentaoxide and aluminum oxide (P$_2$O$_5$.Al$_2$O$_3$) type glass; powder glass GSP220A524 having a transition temperature of 410° C. made by Toshiba Glass K.K. as the boron oxide and zinc oxide (B$_2$O$_3$.ZnO) type glass; and powder glass GSP220A530 having a transition temperature of 300° C. made by Toshiba Glass K.K. as the boron oxide, phosphorous pentaoxide and aluminum oxide (B$_2$O$_3$.P$_2$O$_5$.Al$_2$O$_3$) type glass.

In the optical isolator according to the present invention, low melting point glasses are used for adhering the structural parts thereof. Accordingly any outgassing phenomenon due to the rise in ambient temperature is not observed and as in isolator which is assembled with an adhesive and exhibits a discrepancy the optical axis due to the expansion of the adhesive. As a result, the isolator of the present invention has stable optical properties. Moreover, the underlying plating layers do not peel off as in isolators which are assembled through soldering.

To assemble the structural parts for the isolator, a plurality of low melting point glasses are provided and they are used in the order of decreasing transition temperature thereof and heated and molten. Thus, the low melting point glass previously used for adhering a part of the structural parts does not cause re-softening during the subsequent heating and melting process for adhering the remaining structural parts and as a result, there is not observed any discrepancy between the positions of the parts, i.e., any discrepancy in the optical axis. Therefore, the difference of transition temperatures between the plurality of low melting point glasses is sufficient to avoid resoftening of the low melting point glass during another heating. Preferably, this temperature difference is at least 10° C. and, more preferably, more than 20° C.

Moreover, if all of the assembling processes are performed with low melting point glasses, operation for hardening the adhesive which requires a long time period and for applying the underlying plating can be eliminated and, therefore, high productivity can be achieved.

The present invention will hereunder be explained in more detail with reference to the following working examples, but the present invention is by no means limited to these specific Examples.

FIG. 1 shows an embodiment of the optical isolator according to the present invention. This optical isolator comprises a first polarizer 1, a Faraday rotator 3 and a second polarizer 2 which are arranged in this order in a hollow cylindrical magnet 5 integrated into an assembly by adhering them to one another with low melting point glasses 7 and 8. The Faraday rotator 3 and the second polarizer 2 are set in the prescribed positions by the action of a ring-like supporting member 6 inserted between them.

The Faraday rotator 3 is a product obtained by growing a single crystal of garnet represented by the formula: (BiTbEu)$_3$ (FeGa)$_5$O$_{12}$ on a GGG (gadolinium,-gallium, garnet) type single crystal substrate through the liquid phase epitaxial growth technique and then subjecting the resulting single crystal to grinding process and polishing process. An anti-reflection coating is applied onto the plane of light incidence and the light-outgoing plane thereof, respectively. The cylindrical magnet 5 is a cylindrical samarium-cobalt type magnet which is magnetized in the axial direction.

This optical isolator can be prepared in the following manner. First, a powder glass LS-2001 B made by Nippon Electric Glass K.K. is formed into a paste by kneading it with water as a binder. The low melting point powder glass comprises, as principal components, lead oxide and boron oxide and has a transition temperature of 310° C. The formed glass paste is used as low melting point glass 7.

A supporting member 6 is introduced into the cylindrical magnet 5 and a proper amount of the pasty low melting point glass 7 obtained above is applied to the portions of these member to be adhered. The assembly is heated to a temperature of 400° C. using a hot plate to thus melt the low melting point glass 7 and then gradually cooled down to room temperature to thus complete the adhesion of the cylindrical magnet 5 to the supporting member 6. Thereafter, the same paste of the low melting point glass 8 is applied to the region in the vicinity of the portion at which the cylindrical magnet 5 and the supporting member 6 are adhered. The first polarizer 1 and the Faraday rotator 3 are separately positioned on both sides of the supporting member 6 and heated with a hot plate to melt the low melting point glass 8 and then cooled. Thus, the cylindrical magnet 5, the supporting member 6, the Faraday rotator 3 and the first polarizer 1 are united. Finally, the second polarizer 2 is adhered to the cylindrical magnet 5 with the low melting point glass 8 in the same manner as used above to thus complete the optical isolator as shown in FIG. 1.

In this embodiment, all the structural parts for the optical isolator are adhered using the same low melting point glass, but if a plurality of low melting point glasses having different transition temperatures are employed, the optical isolator can be assembled with more higher precision. For instance, a supporting member 6 and a Faraday rotator 3 are first adhered with a low melting point glass having a transition temperature of 310° C. and then a first polarizer 1 and a second polarizer 2 are adhered with, for instance, a low melting point glass having a transition temperature of 250° C. In this case, the low melting point glass used in the preceding adhesion process never causes re-softening.

Figure 2:
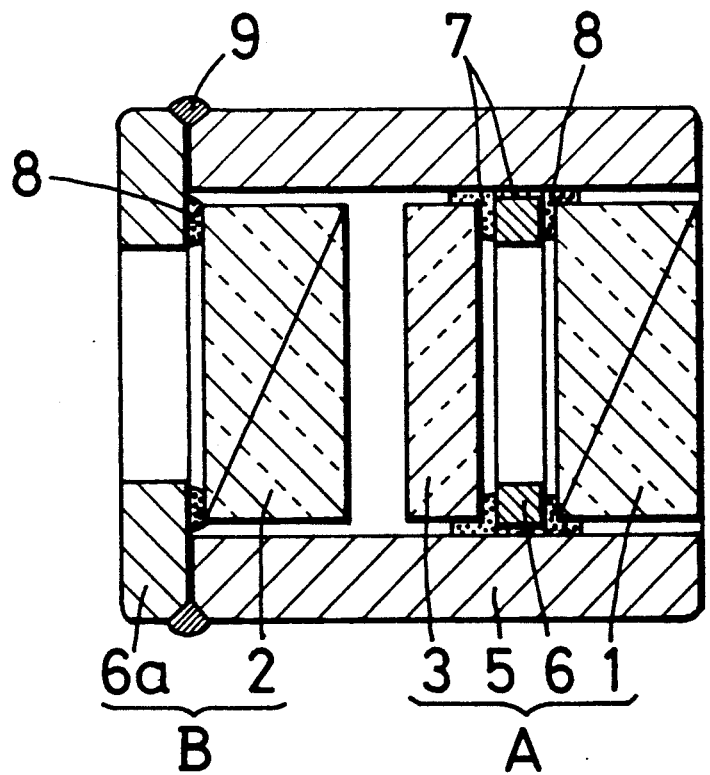
FIG. 2 is a cross sectional view of another embodiment of the optical isolator according to the present invention.

FIG. 2 shows another embodiment of the optical isolator according to the present invention.

The structure of this optical isolator is the same as that for the first embodiment except that the second polarizer 2 is adhered to the cylindrical magnet 5 through a ring-like supporting member 6a and two kinds of low melting point glasses 7 and 8 having different transition temperatures are employed for assembling the isolator or adhering the parts.

The optical isolator is produced as follows. First, two kinds of a powder glass LS-2001 B made by Nippon Electric Glass K.K. and a powder glass GSP220A528 made by Toshiba Glass K.K. are provided. The first powder glass using for low melting point glass 7 comprises, as principal components, lead oxide and boron oxide and has a transition temperature of 310° C. The second powder glass using for low melting point glass 8 comprises, as principal components, lead oxide, boron oxide and thallium oxide and has a transition temperature of 250° C. The powdery low melting point glasses 7 and 8 are, respectively, kneaded together with a binder to give pastes in advance a in the foregoing embodiment. As the binders, there may be used, for instance, water, alcohols, celluloses and/or amyl alcohol. In this Example, water is used as a binder.

A supporting member 6 is introduced into a cylindrical magnet 5 and the pasty low melting point glass 7 is coated on the portion to be adhered. The low melting point glass paste is coated in excess to raise the level thereof. A Faraday rotator 3 is introduced into the cylindrical magnet to thus fix it to the side face of the supporting member 6 and the inner wall of the magnet 5 through the paste layer of the low melting point glass 7. The assembly is heated to 400° C. by a hot plate to melt the low melting point glass 7 in order to fill the portions for adhering and/or supporting the cylindrical magnet 5, the supporting member 6 and the Faraday rotator 3 with the low melting point glass 7. Then the assembly is gradually cooled down to room temperature, the supporting member 6 and the Faraday rotator 3 are adhered to one another and to the inner wall of the cylindrical magnet 5 to thus form an integrated product.

Then the paste of the low melting point glass 8 having a transition temperature lower than that of the low melting point glass 7 is coated at the peripheral portion of the supporting member 6 and a first polarizer 1 is positioned as shown in FIG. 2. The resulting assembly is heated to 350° C. by a hot plate to melt the low melting point glass 8 and simultaneously adhere the first polarizer 1 to the inner wall of the cylindrical magnet. Thus, there is obtained a part A in which the Faraday rotator 3, the first polarizer 1, the cylindrical magnet 5 and the supporting member 6 are integrated. In this case, the low melting point glass 7 previously used for adhering the supporting member 6 and the Faraday rotator to the cylindrical magnet 5 does not cause re-softening and, therefore, the positions at which the Faraday rotator 3 and the supporting member 6 are adhered do not deviate from the required ones.

Separately, a second polarizer 2 is adhered to a supporting member 6a with the low melting point glass 8 to give a part B. The second polarizer 2 adhered to the supporting member 6a is inserted into the cylindrical magnet 5 to thus adapt the part A to the part B and the faces of the supporting members 6 and 6a which come in contact with one another are adhered with a solder 9 having a melting point of 220° C. to thus complete the desired optical isolator.

In this embodiment shown in FIG. 2, the part A and the part B are adhered through soldering, but this adhesion may be performed using a low melting point glass having a transition temperature lower than those for the low melting point glasses 7 and 8.

What is claimed is:

1. An optical isolator which comprises a first polarizer, a Faraday rotator and a second polarizer which are adhered to one another in this order and supported in a cylindrical magnet, wherein the plurality of adhered and supported portions comprise two kinds of low melting point glasses having different transition temperatures.

2. The optical isolator as set forth in claim 1 wherein the low melting point glass is a member selected from the group consisting of a glass mainly comprising lead oxide and boron oxide; a glass mainly comprising lead oxide, boron oxide and zinc oxide; a glass mainly comprising lead oxide, boron oxide and thallium oxide; a glass mainly comprising phosphorous pentaoxide and aluminum oxide; a glass mainly comprising boron oxide and zinc oxide; and a glass mainly comprising boron oxide, phosphorous pentaoxide and aluminum oxide.

3. The optical isolator as set forth in claim 1 wherein the transition temperature of the low melting point glass is not more than 400° C.

4. The optical isolator as set forth in claim 1 wherein a transition temperature of a low melting point glass having a lower transition temperature of the two kinds is at least 10° C. lower than the other low melting point glass having a higher transition temperature of the two kinds.

5. An optical isolator which comprises a first polarizer, a Faraday rotator and a second polarizer which are adhered to one another in this order and supported in a cylindrical magnet, wherein the plurality of adhered and supported portions comprise a low melting point glass and a solder having a lower melting point than a transition temperature of the low melting point glass.

6. The optical isolator as set forth in claim 5 wherein the low melting point glass is selected from the group consisting of a glass mainly comprising lead oxide and boron oxide; a glass mainly comprising lead oxide, boron oxide and zinc oxide; a glass mainly comprising lead oxide, boron oxide and thallium oxide; a glass mainly comprising phosphorous pentaoxide and aluminum oxide; a glass mainly comprising boron oxide and zinc oxide; and a glass mainly comprising boron oxide, phosphorous pentaoxide and aluminum oxide.

7. The optical isolator as set forth in claim 5 wherein the transition temperature of the low melting point glass is not more than 400° C.

8. The optical isolator as set forth in claim 5 wherein the transition temperature of the low melting point glass is at least 10° C. higher than the melting point of the solder.

9. A method for producing an optical isolator which comprises a first polarizer, a Faraday rotator, a second polarizer and a magnet as structural parts thereof, comprising the steps of assembling a part of the structural parts with a first low melting point glass, and assembling the other parts of the structural parts with a second low melting point glass having a lower transition temperature than the first low melting point glass.

10. The method for producing the optical isolator as set forth in claim 9 wherein the low melting point glasses are selected from the group consisting of a glass mainly comprising lead oxide and boron oxide; a glass mainly comprising lead oxide, boron oxide and zinc oxide; a glass mainly comprising lead oxide, boron oxide and thallium oxide; a glass mainly comprising phosphorous pentaoxide and aluminum oxide; a glass mainly comprising boron oxide and zinc oxide; and a glass mainly comprising boron oxide, phosphorous pentaoxide and aluminum oxide.

11. The method for producing the optical isolator as set forth in claim 9 wherein the transition temperature of the low melting point glasses is not more than 400° C.

12. The method for producing the optical isolator as set forth in claim 9 wherein the difference of the transition temperature between the low melting point glass having the lower transition temperature and the other low melting point glass is at least 10° C.

13. A method for producing an optical isolator which comprises a first polarizer, a Faraday rotator, a second polarizer and a magnet as structural parts thereof, comprising the steps of assembling a part of the structural parts with a low melting point glass, and assembling the other parts of the structural parts with a solder having a lower melting point than a transition temperature of the low melting point glass.

14. The method for producing the optical isolator as set forth in claim 13 wherein the low melting point glass is selected from the group consisting of a glass mainly comprising lead oxide and boron oxide; a glass mainly comprising lead oxide, boron oxide and thallium oxide; a glass mainly comprising phosphorous pentaoxide and aluminum oxide; a glass mainly comprising boron oxide and zinc oxide; and glass mainly comprising boron oxide, phosphorous pentaoxide and aluminum oxide.

15. The method for producing the optical isolator as set forth in claim 13 wherein the transition temperature of the low melting point glass is not more than 400° C.

16. The method for producing the optical isolator as set forth in claim 13 wherein the transition temperature of the low melting point glass is at least 10° C. higher than the melting point of the solder.

* * * * *